United States Patent
Buob

(10) Patent No.: US 9,636,759 B2
(45) Date of Patent: May 2, 2017

(54) CRANKSHAFT MILLING CUTTER

(71) Applicant: Walter AG, Tübingen (DE)

(72) Inventor: Rolf Buob, Horb (DE)

(73) Assignee: Walter AG, Tübingen (DE)

( * ) Notice: Subject to any disclaimer, the term of this patent is extended or adjusted under 35 U.S.C. 154(b) by 173 days.

(21) Appl. No.: 14/377,907

(22) PCT Filed: Mar. 22, 2013

(86) PCT No.: PCT/EP2013/056131
§ 371 (c)(1),
(2) Date: Aug. 11, 2014

(87) PCT Pub. No.: WO2013/144030
PCT Pub. Date: Oct. 3, 2013

(65) Prior Publication Data
US 2015/0037107 A1 Feb. 5, 2015

(30) Foreign Application Priority Data
Mar. 29, 2012 (DE) .................. 10 2012 102 747

(51) Int. Cl.
B23C 3/06 (2006.01)
B23C 5/24 (2006.01)
B23C 5/08 (2006.01)

(52) U.S. Cl.
CPC .............. B23C 5/2462 (2013.01); B23C 5/08 (2013.01); B23C 5/241 (2013.01); B23C 5/2489 (2013.01);
(Continued)

(58) Field of Classification Search
CPC ....... B23C 2215/20; B23C 5/08; B23C 5/241; B23C 5/2462; B23C 5/2489; B23C 5/207;
(Continued)

(56) References Cited

U.S. PATENT DOCUMENTS 4,938,638 A   7/1990  Hessman et al.
5,919,008 A *  7/1999  Shimomura ............... B23C 3/06
                                                    407/35
(Continued)

FOREIGN PATENT DOCUMENTS

CN   1035786    9/1989
CN   1671501    9/2005
(Continued)

OTHER PUBLICATIONS

English translation of Notification of First Office Action for Chinese Application No. 201380018153.2 dated Nov. 13, 2015.
(Continued)

*Primary Examiner* — Sara Addisu
(74) *Attorney, Agent, or Firm* — Morgan, Lewis & Bockius LLP

(57) ABSTRACT

A crankshaft milling cutter has a disc-shaped main body rotatable about an axis perpendicular to the disc plane and on the periphery recesses for receiving indexable cutting inserts for removing an allowance on the crankshaft blank. At least some of the recesses are open both in the radial direction and in at least one axial direction of the main body and a first group of said recesses receives cutting inserts designed for removing the allowance on an oil collar adjoining a shaft journal. To provide a crankshaft milling cutter able to meet the increasing requirements with regard to dimensional and positional tolerances placed on a crankshaft milling cutter and at the same time reduces the time needed for fine adjustment of the crankshaft milling cutter, only some of the first group of recesses has devices for setting the axial position of the indexable cutting insert received in each case therein.

27 Claims, 3 Drawing Sheets

Figure 1:
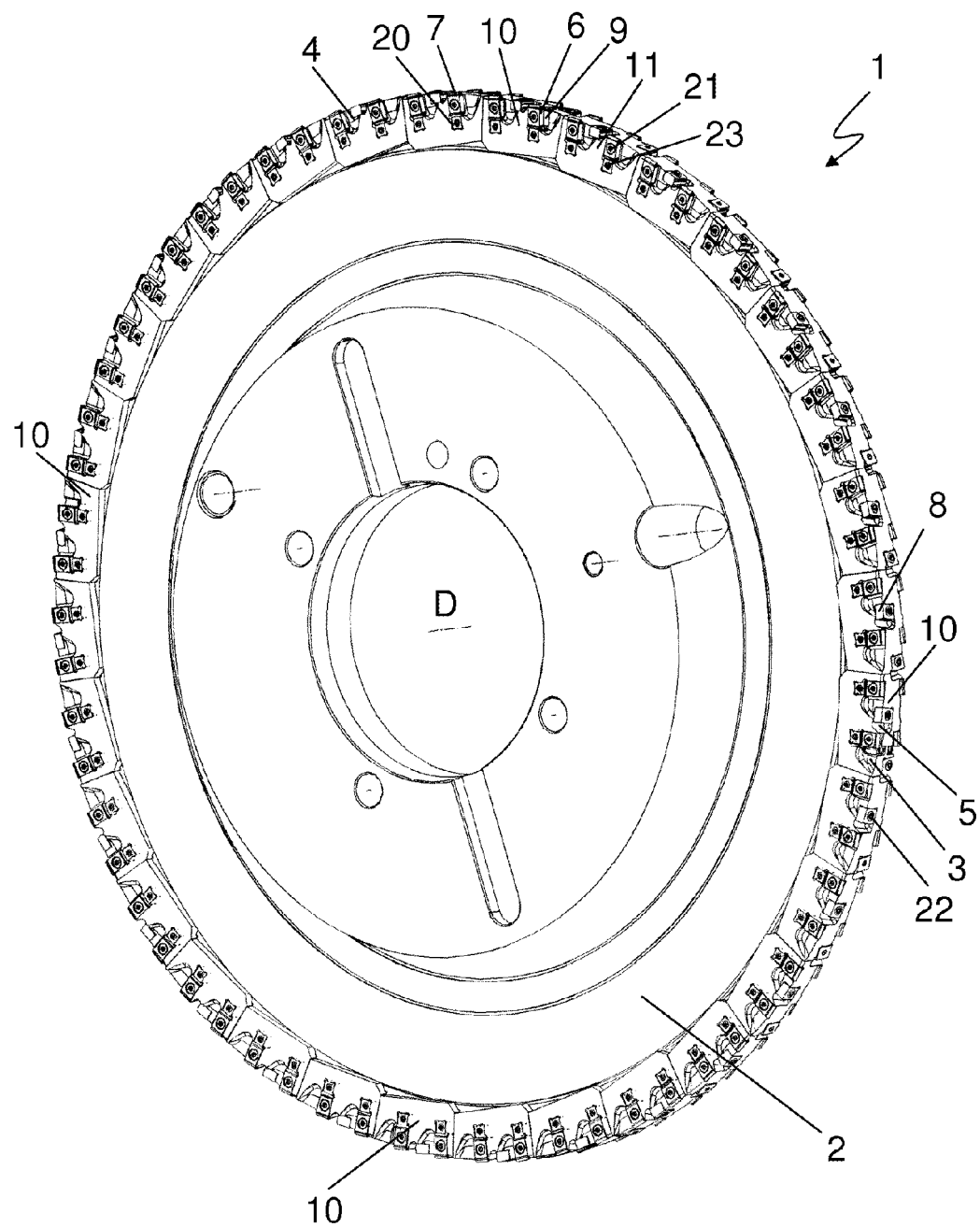

(52) U.S. Cl.
CPC ........ *B23C 3/06* (2013.01); *B23C 2200/0483* (2013.01); *B23C 2215/20* (2013.01); *Y10T 407/1928* (2015.01)

(58) Field of Classification Search
CPC ........ B23C 2200/0483; B23C 2210/24; B23C 2210/503; B23C 3/06
See application file for complete search history.

(56) References Cited

U.S. PATENT DOCUMENTS

| | | | |
|---|---|---|---|
| 7,402,010 | B2 | 7/2008 | Bauer et al. |
| 7,938,599 | B2 * | 5/2011 | Takiguchi ................. B23C 3/06 407/35 |
| 8,814,478 | B2 | 8/2014 | Baer et al. |
| 2003/0215294 | A1 | 11/2003 | Wermeister et al. |
| 2005/0047876 | A1 | 3/2005 | Schaupp et al. |
| 2006/0165501 | A1 | 7/2006 | Heinloth |
| 2009/0052997 | A1 * | 2/2009 | Shimizu ................... B23C 3/06 407/34 |
| 2011/0222973 | A1 | 9/2011 | Baer et al. |

FOREIGN PATENT DOCUMENTS

| | | |
|---|---|---|
| CN | 101786181 | 7/2010 |
| CN | 102015172 | 4/2011 |
| DE | 102 38 451 A1 | 2/2004 |
| DE | 20 2004 015 343 | 11/2005 |
| DE | 20 2008 006 375 U1 | 10/2008 |
| EP | 1 356 885 A2 | 10/2003 |
| EP | 1 512 478 A1 | 3/2005 |
| WO | 2005/005084 A1 | 1/2005 |
| WO | WO 2006/002862 | 1/2006 |

OTHER PUBLICATIONS

International Search Report of PCT/EP2013/056131 dated Jun. 7, 2013.
German Search Report in DE 10 2012 102 747.1 dated Dec. 3, 2012.
International Preliminary Report on Patentability dated Oct. 1, 2014, for International Application No. PCT/EP2013/056131.

* cited by examiner

CRANKSHAFT MILLING CUTTER

RELATED APPLICATIONS

The present application is a U.S. National Phase Application of International Application No. PCT/EP2013/056131, filed 22 Mar. 2013, which claims priority to German Application No. 10 2012 102 747.1, filed 29 Mar. 2012.

The present invention concerns a crankshaft milling cutter having a disk-shaped main body which is rotatable about an axis perpendicular to the plane of the disk and at the periphery of which there are provided recesses for receiving indexable cutting inserts for removing an allowance on a crankshaft blank, wherein at least a part of the recesses are open both in the radial direction and also in at least one axial direction of the main body and wherein a first group of said recesses is provided for receiving cutting inserts which are adapted to remove the allowance at an oil collar delimiting a shaft journal.

Here and hereinafter the term crankshaft is used quite generally to denote a machine component which converts linear movements into rotating movements or rotating movements into linear movements. In particular that is used to denote crankshafts and camshafts of internal combustion engines. In the series manufacture of crankshafts recourse is mostly had to forged or cast shafts. In general firstly a crankshaft blank is produced, which is of the essential geometrical shapes and dimensions for the later crankshaft. In addition however the blank also has a generally irregular allowance which is to be removed to finish the crankshaft. Such a removal operation is effected for example by machining with a defined cutting member like for example turning, turn broaching or in particular milling. The reason for the need for precise removal of the allowance are the increasingly higher levels of demand that modern engine constructions make on the operational efficiency and smoothness of running of crankshafts. At the same time reducing the costs of manufacture of crankshafts is a crucial aim for economic considerations.

To meet the demands made on such a shaft in terms of dimensional accuracy, rotational truth and surface nature the cast or forged crankshaft blanks have to be appropriately subjected to further machining. That applies in particular in the region of the shaft journals for the main and crank pin bearings. In that respect high demands are made precisely on the dimensional accuracy of the oil collars (thrust collars) of the crankshaft, which are decisive for axial guidance of connecting rods by the crankshaft. Methods of milling machining of crankshafts with external milling cutters in the form of disk milling cutters are known for that purpose. Such a disk milling cutter has recesses for receiving cutting inserts. In general both diameter inserts arranged along the periphery of the main body and also axially arranged groove cutting plate inserts which inter alia produce a respective relief groove at the transition between journal and oil collar are provided in the recesses as cutting inserts. The diameter inserts remove the allowance in the region of the shaft journals and accordingly produce the journal diameter. The main cutting edges of the groove cutting plate inserts respectively remove the allowance at the oppositely disposed surfaces of the oil collars for the connecting rods and thus produce the bearing width. In addition they produce the above-mentioned relief groove which is arranged in the form of a groove-like recess in the transitional region to the oil collars and which extends generally in a ring shape around the crankshaft journal. In that case, fine machining or surface finishing of the surfaces of the oil collars is effected by means of the secondary cutting edges of the groove cutting plate inserts. In general indexable cutting inserts are used as the cutting inserts. Machining of crankshafts involves using crankshaft milling cutters in the form of disk milling cutters of a diameter of for example about 700 mm and with for example up to 300 inserted indexable cutting inserts.

To receive the individual indexable cutting inserts for milling machining of the crankshaft blank, provided on the main body of the crankshaft milling cutter are suitable recesses in which the indexable cutting inserts are disposed, that is to say the diameter plates along the periphery axially within the profile and the groove cutting plate inserts at the edges at the transition of the periphery of the main body to the face. To achieve the necessary precision in terms of surface machining or material removal on a crankshaft blank and in particular in the region of the oil collars each individual indexable cutting insert is finely adjusted. To be able to meet the requirements in the field of modern engine constructions fine adjustment of the axial position of the active groove cutting plate inserts for example is to be observed in that respect within a tolerance limit of a maximum of 5 μm. To permit such precision in fine adjustment suitable devices are provided for adjusting the position of the indexable cutting inserts. The nature of the devices, that is to say the directional adjustments which can be implemented therewith, depends on the functional implementation of the indexable cutting inserts, the position of which is to be adjusted by means of the devices. Diameter inserts, by virtue of their tangential cutting edge orientation, generally only require devices for fine adjustment of their radial position. In comparison groove cutting plate inserts, by virtue of their dual functionality, that is to say on the one hand removal of the allowance at the oil collars or fine machining thereof and on the other hand producing the relief groove, require both devices for fine adjustment of their axial position and also their radial position. Fine adjustment of for example up to 80 cutting inserts or more for each side of the crankshaft milling cutter requires a manual working procedure involving several hours, involving human labor and equipment and causing increased costs.

The recesses for receiving the groove cutting plate inserts are here distinguished as the first group of recesses from the recesses for the other indexable cutting inserts, that is to say in particular from a second group for receiving the diameter inserts.

Therefore the object of the present invention is to provide a crankshaft milling cutter which is able to meet the increasing demands in regard to shape and positional tolerance on a crankshaft milling cutter and which at the same time reduces the necessary time for fine adjustment of the crankshaft milling cutter.

That object is attained in that, in the crankshaft milling cutter described in the opening part of this specification, only a part of the first group of recesses has devices for adjusting the axial position of the respective indexable cutting insert received therein.

Insofar as only a part of the first group of recesses provided for receiving groove cutting plate inserts has devices for adjusting the axial position the number of cutting inserts to be finely adjusted by means of those devices is reduced.

Thus an embodiment according to the invention of a crankshaft milling cutter leads to a marked reduction in the amount of time for fine adjustment, in dependence on the number of groove cutting plate inserts provided overall. In order to ensure the dual functionality of the groove cutting plate inserts, that is to say on the one hand removal of the allowance at the oil collars and on the other hand cutting the relief groove, the recesses for receiving groove cutting plate inserts are open both in the radial direction and also in at least one axial direction of the main body. In that respect the crankshaft milling cutter according to the invention makes use of the fact that the predominant part of the allowance at the oil collars is removed by the main cutting edges of the groove cutting plate inserts which are at the periphery of the milling cutter while the surfaces of the oil collars are finely machined by the secondary cutting edges of the groove cutting plate inserts, which of a relatively great length. The dual functionality of the groove cutting plate inserts requires that, as a result of the larger amount of material to be removed in the region of the main cutting edges of the groove cutting plate inserts for efficient material machining, a larger number of active groove cutting plate inserts is also necessary for each crankshaft milling cutter revolution for allowance removal, than for fine machining of the oil collars. Accordingly, only a part of the secondary cutting edges of the groove cutting plate inserts contributes to the fine machining of the oil collars. In that way it is possible to achieve good surface machining of the oil collars while at the same time the necessary assembly complication and expenditure can be reduced.

In an embodiment of the crankshaft milling cutter according to the invention at most a quarter, preferably at most an eighth and particularly preferably at most a sixteenth of the first group of recesses which are open in the radial and axial directions has devices for adjusting the axial position of the respective indexable cutting insert received therein. Accordingly the necessary amount of time for fine adjustment of the corresponding groove cutting plate inserts in the axial direction can be reduced to up a quarter, an eighth or even a sixteenth. For material machining which is as uniform as possible it is recommended that the axial adjustable indexable cutting inserts are to be arranged symmetrically with respect to the axis of rotation of the milling cutter, on the main body, in which case the axially non-adjustable indexable cutting inserts are also arranged in axially symmetrical and uniformly distributed relationship. Such an arrangement also contributes to avoiding an imbalance. The recesses for the other groove cutting plate inserts which are only positioned radially preferably by way of support plates are of such a dimension in depth that the secondary cutting edges do not project axially beyond the secondary cutting edges of the axially adjustable groove cutting plate inserts.

In an embodiment according to the invention at its periphery the main body on both mutually opposite axial sides has respective axially and radially open recesses of the first group, wherein on both sides only a respective part of those first groups of recesses has devices for adjusting the axial position of the respective indexable cutting insert received therein. Accordingly provided on both mutually opposite axial sides of the main body are groove cutting plate inserts for simultaneously machining the two mutually opposite oil collars delimiting a shaft journal, in one working step. In that case groove cutting plate inserts on both axial sides require fine adjustment of the axial position. By fine adjustment of only a part of the groove cutting plate inserts on each side once again the necessary adjustment time is effectively reduced and at the same time machining of both oil collars with the same precision is possible.

In an embodiment those recesses of the first group, that have devices for adjusting the axial position of the respective indexable cutting insert received therein, are arranged on the two mutually opposite axial sides of the main body in pair-wise relationship at the same respective peripheral positions. Such a paired arrangement makes it possible to ensure that the active cutting edges of the groove cutting plate inserts generally come into engagement simultaneously with the material of the allowance of the oppositely disposed oil collars and synchronously remove that material. Accordingly this avoids a wobble movement of the milling cutter by one-sided loadings as a consequence of cutting forces. That contributes to a more stable mode of operation and a more uniform and more precise removal of material.

The crankshaft milling cutter of an embodiment according to the invention is characterised in that those recesses of the first group, that have devices for adjusting the axial position of the respective indexable cutting insert received therein, are arranged at equal angular spacings along the periphery of the crankshaft milling cutter. An arrangement of the finely adjusted groove cutting plate inserts at equal angular spacings permits uniform removal of the allowance and fine machining. Accordingly it is possible to avoid portions of the oil collars being machined exclusively by groove cutting plate inserts which are not finely adjusted, that is to say in part no surface finishing or no adequate surface finishing occurs. Rather, all portions of the oil collars, that are to be machined, are finely machined uniformly with the finely adjusted groove cutting plate inserts.

In the case of a crankshaft milling cutter the periphery of the main body at least partially comprises interchangeable cassettes in which are provided at least those recesses of the first group, which have devices for adjusting the axial position of the respective indexable cutting insert received therein. Accordingly the axially adjustable groove cutting plate inserts can be arranged in a fashion corresponding to the arrangement of the cassettes with devices for adjusting the axial position variably along the periphery of the crankshaft milling cutter. The use of pre-fitted cassettes makes it possible for the required assembly time for equipping the crankshaft milling cutter on site to be markedly reduced. In particular the use of cassettes permits quick simple exchange of milling cutter segments which are worn, damaged or which have become unusable.

In an embodiment of the crankshaft milling cutter according to the invention a first part of cassettes has recesses of the first group with devices for adjusting the axial position of the respective indexable cutting insert received therein and a second part of cassettes has only such recesses of the first group, that have no devices for adjusting the axial position of the respective indexable cutting insert received therein. Accordingly uniform distribution of axially adjustable and axially non-adjustable groove cutting plate inserts along the periphery of the crankshaft milling cutter can also be implemented in the case where the number of axially adjustable groove cutting plate inserts is markedly less than the number of axially non-adjustable groove cutting plate inserts. The arrangement of the corresponding groove cutting plate inserts is therefore effected by means of a corresponding arrangement of the corresponding cassettes.

In an embodiment at most half and preferably at most a quarter of all cassettes has recesses of the first group with devices for adjusting the axial position of the respective indexable cutting insert received therein. By virtue of such a reduction in the number of cassettes with devices for adjusting the axial position the number of the axially adjustable groove cutting plate inserts is also correspondingly reduced, which in turn leads to a correlated reduction in the amount of time for fine adjustment.

In the embodiment of a crankshaft milling cutter according to the invention the cassettes of the first part of cassettes are arranged at equal angular spacings along the periphery of the crankshaft milling cutter in order to uniformly distribute the loading on the cutting edges. In that respect it is possible to ensure that all portions of the oil collars, that are to be machined with groove cutting plate inserts, are machined with finely adjusted groove cutting plate inserts and thus the required constant precision in surface machining is achieved.

In an embodiment the crankshaft milling cutter is equipped with indexable cutting inserts, of which a first group is of such a configuration and is arranged in the first group of recesses in such a way that the associated active cutting edges of each of said indexable cutting inserts respectively have a main and a secondary cutting edge wherein the main cutting edges which are provided for removing an allowance at an oil collar and for cutting a relief groove in the transitional region between the oil collar and the crankshaft journal are respectively formed by a first portion of the active cutting edges in the form of a radial projection curved substantially in a nose shape. The above-mentioned main cutting edges of that first group project radially beyond the active cutting edges of a second group of indexable cutting inserts, which are provided for removing an allowance at a crankshaft journal, wherein the main cutting edges of the first group of indexable cutting inserts go from their radially outermost end firstly axially and then curved in an arc radially inwardly into secondary cutting edges which extend substantially radially and which are provided for fine machining of the oil collar. The secondary cutting edges firstly extend parallel to the plane of the disk of the main body and then further radially inwardly with a small radial clearance angle. In that case however only a part of the first group of indexable cutting inserts is axially adjustable so that only the secondary cutting edges which are parallel to the plane of the disk of that part of the first group are active and in particular are adjustable in such a way that they have an axial projecting portion in relation to the secondary cutting edges of the other indexable cutting inserts of the first group. The main and secondary cutting edges of the groove cutting plate inserts generally extend approximately in a plane containing the axis of rotation.

The plane containing the main and secondary cutting edges of the groove cutting plate inserts can however also be tilted through a small angle to adjust a desired radial and axial rake and clearance angle in relation to the axis of rotation and a plane containing the axis of rotation and main and secondary cutting edges also do not necessarily have to extend in one plane.

In that respect it is advantageous if the secondary cutting edges which are crucial for surface finishing or fine machining of the oil collars respectively have, besides a portion which extends in a radial plane and which directly adjoins the arcuate transition from the main cutting edge, a further radially inner portion which does not extend exactly parallel to the plane of the disk or perpendicularly to the axis of rotation, but is inclined through an angle of between 1° and 3°, preferably through 2°, with respect to the plane of the disk or a plane perpendicular to the axis of rotation. The secondary cutting edge can also be curved overall in a relatively large, so-called wiper radius. In both cases the radially inner portion of the secondary cutting edge of the cutting insert includes a corresponding clearance angle with the workpiece surface, that is to say the surface of the oil collar. The main cutting edge, that is to say the nose-shaped projection with the curved transition to the radially extending secondary cutting edge of the groove cutting plate insert, not only cuts out the relief groove at the axial ends of the machined shaft journal, but is also crucial for removal of the predominant part of the allowance at the oil collars. As a consequence of the axial projection of the axially adjustable groove cutting plate inserts they produce the exact and concluding cut, that is to say fine machining or surface finishing.

In a further embodiment the indexable cutting inserts of the second group of such a configuration and are arranged in the second group of recesses in such a way that their active cutting edges extend substantially in a notional envelope in the form of a cylindrical peripheral surface perpendicular to the plane of the disk. As a result the indexable cutting inserts produce the diameter of the shaft journal by removal of the machining allowance. Those diameter inserts are generally arranged tangentially along the periphery of the main body, but a corresponding radial orientation is also conceivable.

Indexable cutting inserts of the second group in the peripheral direction of an embodiment of the crankshaft milling cutter are arranged alternately on the right-hand and the left-hand sides of the peripheral surface, wherein at least two respective indexable cutting inserts of the first group are arranged between two indexable cutting inserts of the second group. Preferred in this case is a cross-toothed arrangement of the diameter inserts, in which the length ratios of the active cutting edges are so selected that the entire longitudinal width to be milled of the shaft journals is traversed by two successive diameter inserts. Accordingly, together with the two groove cutting plate inserts, using those at least four indexable cutting inserts, the entire region to be milled or finely machined, that is to say the shaft journal periphery, the oil collars and the relief groove, are machined. It is therefore possible for the entire allowance which is to be removed of a complete crank pin journal and the two adjacent oil collars to be removed inclusive of surface finishing of the oil collars in a single working operation without additional milling tools.

In an embodiment it is advantageously provided that the seat surfaces, which determine the axial position of the indexable cutting inserts, of the recesses are axially adjustable with axial adjusting devices in such a way that their axial position projects axially outwardly beyond the axial position of all corresponding seat surfaces of all recesses of the first group without adjusting devices. When using similar cutting inserts in the first group of recesses this then ensures that, in at least one position of the axial adjusting devices, the cutting inserts which determine the axial dimension of the oil collars are exclusively the adjustable cutting inserts.

More generally, in an advantageous configuration, the indexable cutting inserts are adjustable in the recesses with axial adjusting devices in such a way that they project axially outwardly beyond the axial position of all indexable cutting inserts, more precisely the axially most projecting cutting edges, in the recesses of the first group without adjusting devices.

Figure 2:
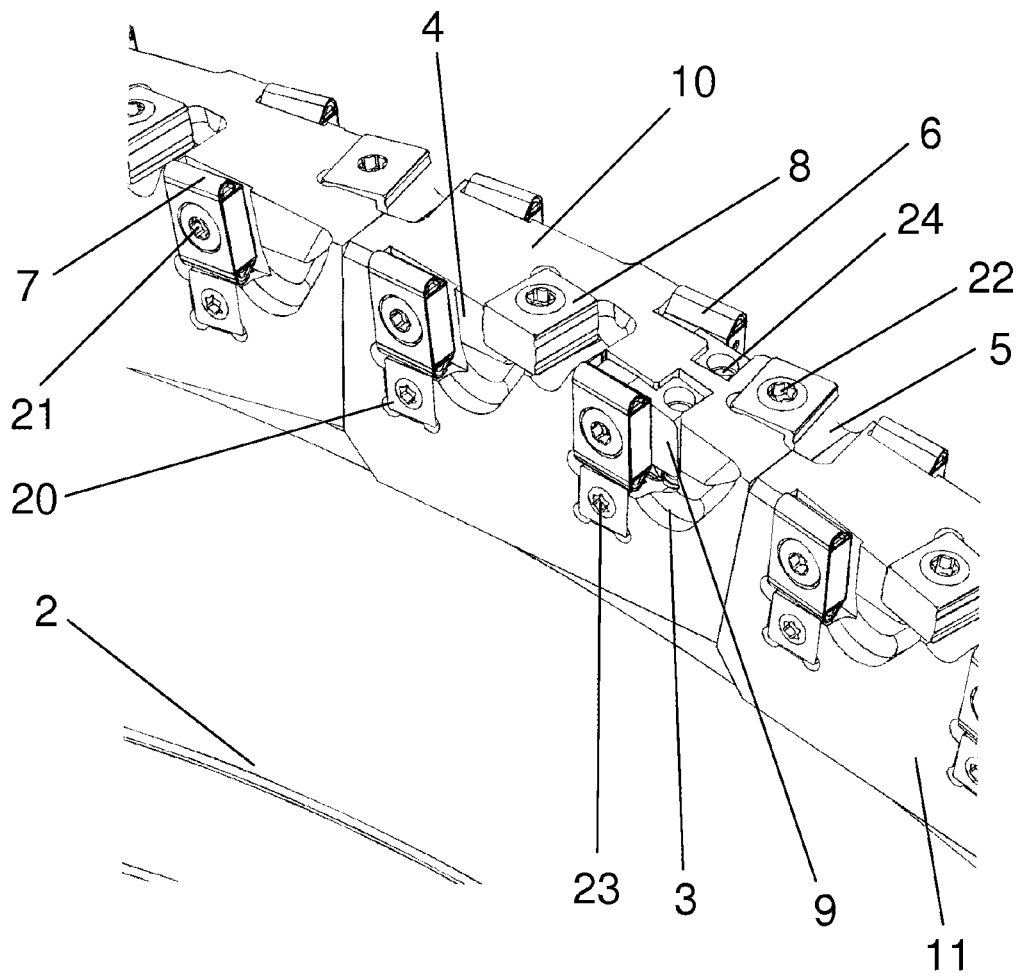
Figure 3:
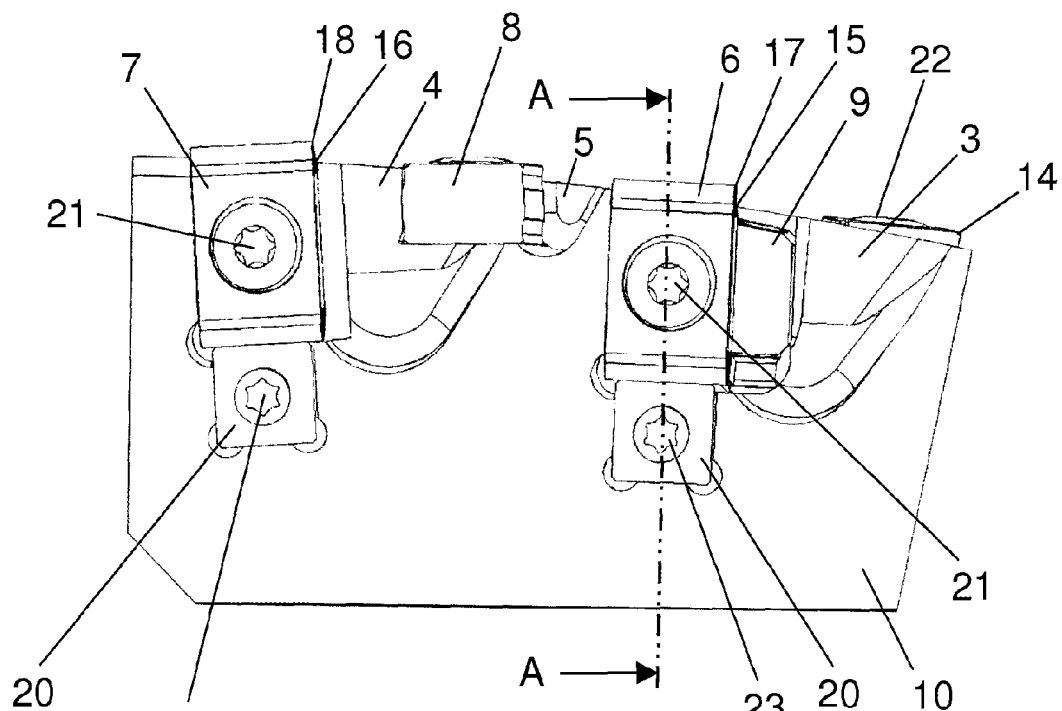
Figure 4:
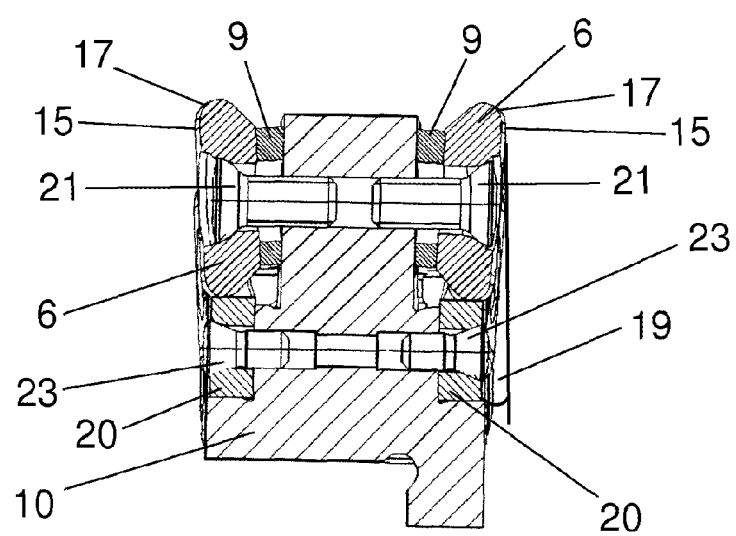

Further advantages, features and possible uses of the present invention will be apparent from the description hereinafter of a preferred embodiment and the related Figures in which:

FIG. 1 shows a three-dimensional view of a crankshaft milling cutter according to the invention with cassettes, FIG. 2 show a detail view of a cassette with devices for adjusting the axial position as shown in FIG. 1, FIG. 3 shows a side view of the cassette of FIG. 2, and FIG. 4 shows a sectional view of the cassette of FIG. 3 along line A-A.

FIG. 1 shows a three-dimensional view inclinedly from the right of a crankshaft milling cutter 1 according to the invention. The axis of rotation D passes through the center of the circular central opening of the disk-shaped main body 2. Arranged at the edge or at the periphery of the disk-shaped main body 2 are cassettes 10, 11 with indexable cutting inserts 6, 7, 8. In total 32 cassettes 10, 11 each having two diameter inserts 8 and four groove cutting plate inserts 6, 7 are to be seen. Four of the 32 cassettes 10, 11 have devices 9 for adjusting the axial position. Arranged between two cassettes 10 with devices 9 for adjusting the axial position are seven respective cassettes 11 without the possibility of axial positional adjustment. Accordingly each eighth cassette 10 is axially adjustable, wherein the peripheral angle between two axially adjustable cassettes 10 is about 90° in each case.

FIG. 2 shows a view inclinedly from top right of an axially adjustable cassette 10. It is shown arranged in the mounted condition on the main body 2. A total of six recesses 3, 4, 5 for receiving indexable cutting inserts 6, 7, 8, which are open both in the radial and also in the axial directions, can be clearly seen. In the case of the two recesses 5 for the diameter inserts 8 the radial opening area is larger than the axial one. The diameter inserts 8 are fixed by means of a screw 22 arranged substantially perpendicularly to the axis of rotation D of the disk milling cutter 1. The recesses 5 for the diameter inserts 8 are respectively continuously connected to a recess 3, 4 for a groove cutting plate insert 6, 7. The groove cutting plate inserts 6, 7 are arranged axially substantially parallel to the plane of the disk and the cassette side surface.

They are fixed by means of screws 21 extending parallel to the axis of rotation D. A respective support plate 20 is arranged fixedly in the radial direction beneath the groove cutting plate inserts 6, 7 by means of screws 23 extending substantially parallel to the axis of rotation D. The support plates 20 permit adjustment of the radial position of the groove cutting plate inserts 6, 7. The front pair of the groove cutting plate inserts 6, 7 respectively arranged in pair-wise relationship on opposite sides of the cassette 10 is respectively arranged on a wing-shaped element 9. The wing surface is arranged substantially perpendicularly to the axis of rotation D in the plane of the disk-shaped main body. The angle of opening of the wing 9, that is to say an angle of inclination with respect to the plane of the main body 2, can be adjusted by means of radially oriented adjusting screw 24. In that case the wing 9 is pivoted about a radially extending axis of rotation and urges the groove cutting plate insert 6 outwardly in the axial direction. The axial position of the groove cutting plate insert 6 can be exactly adjusted in that way. In that respect the axially adjustable groove cutting plate inserts 6 have an axially projecting portion in relation to the non-adjustable groove cutting plate inserts 7.

The geometrical shape of the cassette 10 will be clear from the side view in FIG. 3. It is possible to see an approximately parallelepipedic basic shape, wherein the front end face involves an angle of inclination which is inclined forwardly relative to the bottom surface. The top side has a forwardly extending curvature in the direction of the bottom surface. The laterally arranged groove cutting plate inserts 6, 7 are supported from below by support plates 20. It is possible to see moreover that the main cutting edges 17, 18 of the groove cutting plate inserts 6, 7 respectively project in the radial direction beyond the active cutting edges 14 of the diameter inserts 8 arranged immediately in front thereof.

A cross-section along line A-A in FIG. 3 is shown in FIG. 4. The section extends perpendicularly to the outside surface of the cassette 10 through the fixing screws 21, 22 of the groove cutting plate inserts 6 and the support plate 20 arranged therebeneath and through the devices 9 for adjusting the axial position. It is possible to see the main cutting edge 17 of the groove cutting plate inserts 6, that is formed by a nose-shaped radial projection which from its radially outward end firstly extends axially and then curved in an arc radially inwardly and goes into the radially extending secondary cutting edge 15. The devices 9 for adjusting the axial position are arranged between the cassette body 10 and the groove cutting plate inserts 6. It can be seen that the radially outer portion of the device 9 above the fixing screw 21 is wider than the part axially beneath the fixing screw 21. Accordingly the radially outer part of the groove cutting plate inserts 6 is urged outwardly further in the axial direction in the course of the axial positioning operation than the lower portion. As a result the secondary cutting edge 15 of the groove cutting plate insert 6 does not extend completely but rather portion-wise parallel to the plane of the disk of the main body 2 or the side plane of the cassette 10. In particular the secondary cutting edge 15 in adjoining relationship with the main cutting edge 17 firstly extends parallel to the plane of the disk of the main body 2 and then inclined axially inwardly at a radial clearance angle 19, wherein the radial clearance angle 19 is afforded by the slight inclination of the groove cutting plate insert 6 relative to the plane of the disk of the main body 2 as a result of the configuration and arrangement of the device 9.

For the purposes of the original disclosure it is pointed out that all features as can be seen by a man skilled in the art from the present description, the drawings and the claims, even if they are described in specific terms only in connection with certain other features, can be combined both individually and also in any combinations with others of the features or groups of features disclosed here insofar as that has not been expressly excluded or technical aspects make such combinations impossible or meaningless. A comprehensive explicit representation of all conceivable combinations of features is dispensed with here only for the sake of brevity and readability of the description.

LIST OF REFERENCES 1 crankshaft milling cutter
2 main body
3 recess with device 9 for groove cutting plate insert 6
4 recess for groove cutting plate insert 7
5 recess for diameter insert 8
6 groove cutting plate insert axially positionable
7 groove cutting plate insert
8 diameter insert
9 device for adjusting the axial position
10 cassette with axial adjustment option 3
11 cassette without axial adjustment option 3
12 active cutting edge of groove cutting plate insert 6
13 active cutting edge of groove cutting plate insert 7
14 active cutting edge of diameter insert 8
15 active secondary cutting edge of groove cutting plate insert 6
16 active secondary cutting edge of groove cutting plate insert 7
17 active main cutting edge of groove cutting plate insert 6
18 active main cutting edge of groove cutting plate insert 7
19 clearance angle
20 support plate
21 fixing screw for groove cutting plate insert 6, 7
22 fixing screw for diameter insert 8
23 fixing screw for support plate 20

24 adjusting screw for device 9
D axis of rotation of the crankshaft milling cutter 1

The invention claimed is:

1. A crankshaft milling cutter having a disk-shaped main body which is rotatable about an axis perpendicular to the plane of the disk and at the periphery of which there are provided recesses for receiving indexable cutting inserts for removing an allowance on a crankshaft blank,
wherein at least some of the recesses are open both in the radial direction and also in at least one axial direction of the main body,
wherein a first group of said recesses which are open in the radial direction and also in at least one axial direction is provided for receiving cutting inserts which are adapted to remove the allowance at an oil collar delimiting a shaft journal,
wherein at least one and less than all of the first group of recesses has devices for adjusting the axial position of the respective indexable cutting insert received therein, and
wherein seat surfaces, which determine the axial position of the indexable cutting inserts, of the recesses with axial adjusting devices are axially adjustable in such a way that their axial position projects axially outwardly beyond the axial position of the corresponding seat surfaces of all recesses of the first group without adjusting devices.

2. A crankshaft milling cutter as set forth in claim 1, wherein at most a quarter of the first group of recesses which are open in the radial and axial directions has devices for adjusting the axial position of the respective indexable cutting insert received therein.

3. A crankshaft milling cutter as set forth in claim 2, wherein at most an eighth of the first group of recesses which are open in the radial and axial directions has devices for adjusting the axial position of the respective indexable cutting insert received therein.

4. A crankshaft milling cutter as set forth in claim 3, wherein at most a sixteenth of the first group of recesses which are open in the radial and axial directions has devices for adjusting the axial position of the respective indexable cutting insert received therein.

5. A crankshaft milling cutter as set forth in claim 1, wherein at its periphery the main body on both mutually opposite axial sides has respective axially and radially open recesses of the first group, and
wherein on both sides only a respective part of those first groups of recesses has devices for adjusting the axial position of the respective indexable cutting insert received therein.

6. A crankshaft milling cutter as set forth in claim 5, wherein those recesses of the first group, that have devices for adjusting the axial position of the respective indexable cutting insert received therein, are arranged on the two mutually opposite axial sides of the main body in pair-wise relationship at the same respective peripheral positions.

7. A crankshaft milling cutter as set forth in claim 1, wherein those recesses of the first group, that have devices for adjusting the axial position of the respective indexable cutting insert received therein, are arranged at equal angular spacings along the periphery of the crankshaft milling cutter.

8. A crankshaft milling cutter as set forth in claim 1, wherein the periphery of the main body at least partially comprises interchangeable cassettes in which are provided at least those recesses of the first group which have devices for adjusting the axial position of the respective indexable cutting insert received therein.

9. A crankshaft milling cutter as set forth in claim 8, wherein a first part of cassettes has recesses of the first group with devices for adjusting the axial position of the respective indexable cutting insert received therein and a second part of cassettes has only such recesses of the first group, that have no devices or adjusting the axial position of the respective indexable cutting insert received therein.

10. A crankshaft milling cutter as set forth in claim 9, wherein at most half of all cassettes has recesses of the first group with devices for adjusting the axial position of the respective indexable cutting insert received therein.

11. A crankshaft milling cutter as set forth in claim 10, wherein at most a quarter of all cassettes has recesses of the first group with devices for adjusting the axial position of the respective indexable cutting insert received therein.

12. A crankshaft milling cutter as set forth in claim 9, wherein the cassettes of the first part of cassettes are arranged at equal angular spacings along the periphery of the crankshaft milling cutter.

13. A crankshaft milling cutter having a disk-shaped main body which is rotatable about an axis perpendicular to the plane of the disk and at the periphery of which there are provided recesses for receiving indexable cutting inserts for removing an allowance on a crankshaft blank,
wherein at least some of the recesses are open both in the radial direction and also in at least one axial direction of the main body,
wherein a first group of said recesses which are open in the radial direction and also in at least one axial direction is provided for receiving cutting inserts which are adapted to remove the allowance at an oil collar delimiting a shaft journal,
wherein at least one and less than all of the first group of recesses has devices for adjusting the axial position of the respective indexable cutting insert received therein,
wherein the crankshaft milling cutter is equipped with indexable cutting inserts of which a first group is of such a configuration and is arranged in the first group of recesses in such a way that the associated active cutting edges of each of said indexable cutting inserts respectively have a main and a secondary cutting edge,
wherein the main cutting edges which are provided for removing an allowance at an oil collar and for digging a relief groove in the transitional region between the oil collar and the crankshaft journal are formed by a first nose-shaped radial projection which goes from its radially outer end initially axially and then curved in an arc extending inwardly into radially extending secondary cutting edges and projects radially beyond the active cutting edges of a second group of indexable cutting inserts which are provided for removing an allowance on a crankshaft journal,
wherein the secondary cutting edges which are provided for fine machining of the oil collar and are formed by a second portion of the active cutting edges firstly extend in adjoining relationship with the main cutting edges parallel to the plane of the disk of the main body and then at a radial clearance angle relative to the plane of the disk of the main body, and
wherein at least one and less than all of the first group of indexable cutting inserts is axially adjustable and the active secondary cutting edges of said part of the first group, which secondary cutting edges are parallel to the plane of the disk except for a radial clearance angle, are so adjustable that they have an axial projection length with respect to the approximately disk-parallel secondary cutting edges of the other indexable cutting inserts of the first group.

14. A crankshaft milling cutter as set forth in claim 13, wherein the indexable cutting inserts of the second group of such a configuration and are arranged in the second group of recesses in such a way that their active cutting edges extend substantially in a notional envelope in the form of a cylindrical peripheral surface perpendicular to the plane of the disk.

15. A crankshaft milling cutter as set forth in claim 13, wherein the indexable cutting inserts of the second group in the peripheral direction of the crankshaft milling cutter are arranged alternately on the right-hand and the left-hand side of the peripheral surface, and wherein respectively arranged in the peripheral direction between two indexable cutting inserts of the second group are two indexable cutting inserts of the first group.

16. A crankshaft milling cutter as set forth in claim 13, wherein the indexable cutting inserts are adjustable in the recesses of the first group with axial adjusting devices in such a way that they project axially outwardly beyond the axial position of all indexable cutting inserts in the recesses of the first group without adjusting devices.

17. A crankshaft milling cutter as set forth in claim 13, wherein at most a quarter of the first group of recesses which are open in the radial and axial directions has devices for adjusting the axial position of the respective indexable cutting insert received therein.

18. A crankshaft milling cutter as set forth in claim 17, wherein at most an eighth of the first group of recesses which are open in the radial and axial directions has devices for adjusting the axial position of the respective indexable cutting insert received therein.

19. A crankshaft milling cutter as set forth in claim 18, wherein at most a sixteenth of the first group of recesses which are open in the radial and axial directions has devices for adjusting the axial position of the respective indexable cutting insert received therein.

20. A crankshaft milling cutter as set forth in claim 13, wherein at its periphery the main body on both mutually opposite axial sides has respective axially and radially open recesses of the first group, and wherein on both sides only a respective part of those first groups of recesses has devices for adjusting the axial position of the respective indexable cutting insert received therein.

21. A crankshaft milling cutter as set forth in claim 20, wherein those recesses of the first group, that have devices for adjusting the axial position of the respective indexable cutting insert received therein, are arranged on the two mutually opposite axial sides of the main body in pair-wise relationship at the same respective peripheral positions.

22. A crankshaft milling cutter as set forth in claim 13, wherein those recesses of the first group, that have devices for adjusting the axial position of the respective indexable cutting insert received therein, are arranged at equal angular spacings along the periphery of the crankshaft milling cutter.

23. A crankshaft milling cutter as set forth in claim 13, wherein the periphery of the main body at least partially comprises interchangeable cassettes in which are provided at least those recesses of the first group which have devices for adjusting the axial position of the respective indexable cutting insert received therein.

24. A crankshaft milling cutter as set forth in claim 23, wherein a first part of cassettes has recesses of the first group with devices for adjusting the axial position of the respective indexable cutting insert received therein and a second part of cassettes has only such recesses of the first group, that have no devices or adjusting the axial position of the respective indexable cutting insert received therein.

25. A crankshaft milling cutter as set forth in claim 24, wherein at most half of all cassettes has recesses of the first group with devices for adjusting the axial position of the respective indexable cutting insert received therein.

26. A crankshaft milling cutter as set forth in claim 25, wherein at most a quarter of all cassettes has recesses of the first group with devices for adjusting the axial position of the respective indexable cutting insert received therein.

27. A crankshaft milling cutter as set forth in claim 24, wherein the cassettes of the first part of cassettes are arranged at equal angular spacings along the periphery of the crankshaft milling cutter.

* * * * *